United States Patent
Kimura et al.

(10) Patent No.: US 11,280,370 B2
(45) Date of Patent: Mar. 22, 2022

(54) DUAL-TYPE STRAIN WAVE GEARING

(71) Applicant: HARMONIC DRIVE SYSTEMS INC., Tokyo (JP)

(72) Inventors: Hiroaki Kimura, Azumino (JP); Jun Handa, Azumino (JP)

(73) Assignee: Harmonic Drive Systems Inc., Shinagawa-ku ( * ) Notice: Subject to any disclaimer, the term of this patent is extended or adjusted under 35 U.S.C. 154(b) by 561 days.

(21) Appl. No.: 16/346,941

(22) PCT Filed: Aug. 30, 2018

(86) PCT No.: PCT/JP2018/032257
§ 371 (c)(1),
(2) Date: May 2, 2019

(87) PCT Pub. No.: WO2019/065070
PCT Pub. Date: Apr. 4, 2019

(65) Prior Publication Data
US 2020/0056653 A1    Feb. 20, 2020

(30) Foreign Application Priority Data
Sep. 29, 2017  (JP) .............................. JP2017-191871

(51) Int. Cl.
*F16C 19/08*   (2006.01)
*F16H 1/32*    (2006.01)
(Continued)

(52) U.S. Cl.
CPC ............... *F16C 19/08* (2013.01); *F16H 1/32* (2013.01); *F16C 2361/61* (2013.01);
(Continued)

(58) Field of Classification Search
CPC ............. F16H 49/001; F16H 2049/003; F16H 55/0833; F16C 19/08
See application file for complete search history.

(56) References Cited

U.S. PATENT DOCUMENTS

| | | | | |
|---|---|---|---|---|
| 4,969,376 A | * | 11/1990 | Fickelscher | ........... F16H 49/001 475/180 |
| 2011/0088496 A1 | | 4/2011 | Cho et al. | |

(Continued)

FOREIGN PATENT DOCUMENTS

| | | |
|---|---|---|
| JP | 2016023742 A | 2/2016 |
| JP | 2016023745 A | 2/2016 |

OTHER PUBLICATIONS

International Search Report (PCT/ISA/210) dated Nov. 13, 2018, by the Japanese Patent Office as the International Searching Authority for International Application No. PCT/JP2018/032257.
(Continued)

*Primary Examiner* — Terence Boes
(74) *Attorney, Agent, or Firm* — Buchanan Ingersoll & Rooney PC

(57) ABSTRACT

An externally toothed gear of a dual-type strain wave gearing is provided with first and second external teeth having different teeth numbers, and a gap formed between these teeth as a cutter clearance area for tooth cutters. Where L1 is the maximum width of the gap, t1 is a depth from the tooth top land of the first external teeth to the deepest part of the gap, h1 is the tooth depth of the first external teeth, t2 is a depth from the tooth top land of the second external teeth to the deepest part, and h2 is the tooth depth of the second external teeth, any one of the following conditions 1 to 3 is satisfied:

$L1=0.1L-0.35L$, $t1=0.9h1-1.3h1$, and $t2=0.3h2-0.9h2$        Condition 1:

(Continued)

$L1=0.1L–0.35L$, $t1=0.3h1–0.9h1$, and $t2=0.9h2–1.3h2$   Condition 2:

$L1=0.1L–0.35L$, $t1=0.3h1–0.9h1$, and $t2=0.3h2–0.9h2$   Condition 3:

It is possible to obtain a dual-type strain wave gearing in which wear resistance and tooth bottom fatigue strength are increased.

9 Claims, 4 Drawing Sheets

(51) Int. Cl.
*F16H 49/00* (2006.01)
*F16H 55/08* (2006.01)

(52) U.S. Cl.
CPC ........ *F16H 49/001* (2013.01); *F16H 55/0833* (2013.01); *F16H 2049/003* (2013.01)

(56) References Cited

U.S. PATENT DOCUMENTS

| | | | |
|---|---|---|---|
| 2017/0175869 A1* | 6/2017 | Kiyosawa | F16C 19/08 |
| 2017/0198802 A1* | 7/2017 | Kiyosawa | F16H 49/001 |
| 2017/0211677 A1* | 7/2017 | Kiyosawa | F16H 55/12 |
| 2017/0211678 A1* | 7/2017 | Kiyosawa | F16H 1/32 |
| 2017/0211679 A1* | 7/2017 | Kiyosawa | F16H 49/001 |
| 2017/0219050 A1* | 8/2017 | Handa | F16H 1/32 |
| 2017/0284527 A1* | 10/2017 | Gilges | F16C 19/08 |
| 2019/0203819 A1* | 7/2019 | Handa | F16H 55/0833 |

OTHER PUBLICATIONS

Written Opinion (PCT/ISA/237) dated Nov. 13, 2018, by the Japanese Patent Office as the International Searching Authority for International Application No. PCT/JP2018/032257.

\* cited by examiner

DUAL-TYPE STRAIN WAVE GEARING

TECHNICAL FIELD

The present invention relates to a strain wave gearing and particularly to a dual-type strain wave gearing.

BACKGROUND ART

A dual-type strain wave gearing is provided with a pair of internally toothed gears, a flexible externally toothed gear having a cylindrical shape, and a wave generator. In the externally toothed gear, first teeth capable of meshing with one first internally toothed gear and second teeth capable of meshing with another second internally toothed gear are formed in the outer peripheral surface of a radially flexible cylindrical body, the second teeth differing in number from the first teeth. It is easy for a dual-type strain wave gearing to realize a speed ratio of less than 50.

In a dual-type strain wave gearing, first external teeth and second external teeth of an externally toothed gear are formed in the outer peripheral surface of a shared cylindrical body, and the tooth bottom rim parts of the first and second external teeth are connected to each other. Since the first and second external teeth differ in number and tooth profile, the force applied on the first external teeth caused by meshing with the internal teeth of one internally toothed gear is largely different from the force applied on the second external teeth caused by meshing with the internal teeth of the other internally toothed gear. Accordingly, high stress concentration and large amount of torsion occur in portions between the first and second external teeth that are formed in the outer peripheral surface of the flexible cylindrical body formed from a thin-walled elastic body. As a result, in the first and second external teeth, their tooth-contact states with respect to the internal teeth at each point along the tooth trace direction are changed, and their tooth-flank load distributions along the tooth trace direction are greatly fluctuated.

When the tooth-contact states are changed and the tooth-flank load distributions are greatly fluctuated, the tooth bottom fatigue strength and load transfer torque of the externally toothed gear cannot be increased. In order to increase the tooth bottom fatigue strength and transfer load torque of the externally toothed gear, it is necessary that the tooth-flank load distribution be made uniform so as to decrease the maximum tooth-flank load, and that tooth contact on each point along the tooth trace direction be kept in a suitable manner.

Further, the meshing states of the first and second external teeth with the respective internal teeth, especially their meshing states along the tooth trace direction are affected by the support rigidity of the wave generator. When the meshing states along the tooth trace direction are not appropriate, the transfer load torque is decreased.

Therefore, in order to increase the tooth bottom fatigue strength and transfer load torque of the externally toothed gear, it is necessary that the tooth-flank load distribution be made uniform so as to reduce the maximum tooth-flank load, and that tooth contact at each point along the tooth trace direction be kept in a suitable state. Further, in order to maintain an appropriate meshing state at each point along the tooth trace direction, the support rigidity of the wave generator must be increased.

Furthermore, if the externally toothed gear is not appropriately supported by the wave generator, the bearing-ball load distributions appeared in the two rows of the ball bearings of the wave generator become uneven, whereby the lifetime of the bearings is shortened. Therefore, for the purpose that the bearing-ball load distribution is made even and durability of the bearings is enhanced, it is necessary to support the meshing portions between the first external teeth and the internal teeth of one internally toothed gear, and the meshing portions between the second external teeth and the internal teeth of the other internally toothed gear in an appropriate matter.

In view of the above points, the applicant of the present patent application proposes, in patent document 1, a dual-type strain wave gearing which can easily realize a low speed ratio, has an increased tooth bottom fatigue strength of the flexible externally toothed gear, and has a large load capacity.

PRIOR ART DOCUMENTS

Patent Documents

Patent Document 1: JP-A 2016-23742

SUMMARY OF THE INVENTION

Problems to be Solved by the Invention

In some cases in a dual-type strain wave gearing, there is a demand that wear resistance of the active flanks of the both gears and fatigue strength of the flexible externally toothed gear be increased furthermore. In order to meet such demand, an object of the present invention is to provide a dual-type strain wave gearing which is capable of enhancing the wear resistance and the fatigue strength furthermore.

Means of Solving the Problems

In order to solve the problems described above, a dual-type strain wave gearing of the present invention is characterized by including:

a rigid first internally toothed gear in which first internal teeth are formed;

a rigid second internally toothed gear in which second internal teeth are formed, the second internally toothed gear being disposed so as to be coaxially aligned in parallel with the first internally toothed gear;

a flexible externally toothed gear in which first external teeth capable of meshing with the first internal teeth and second external teeth capable of meshing with the second internal teeth are formed in an outer peripheral surface of a radially flexible cylindrical body, the second teeth differing in number from the first teeth, and the externally toothed gear being disposed coaxially inside the first and second internally toothed gears; and a wave generator for flexing the externally toothed gear in a radial direction thereof to cause the first external teeth to partially mesh with the first internal teeth and to cause the second external teeth to partially mesh with the second internal teeth;

wherein a gap is formed between an inner-end surface of the first external teeth in a tooth trace direction and an inner-end surface of the second external teeth in the tooth trace direction, the gap having a prescribed width along the tooth trace direction, and the gap having a deepest part in a tooth depth direction located at a center portion in the tooth trace direction;

wherein a relationship $$0.1L < L1 < 0.35L$$

is satisfied, where L is a width along the tooth trace direction from a tooth-trace-direction outer end of the first external teeth to a tooth-trace-direction outer end of the second external teeth, and L1 is a maximum width of the gap along the tooth trace direction; and wherein, where h1 is a tooth depth of the first external teeth, h2 is a tooth depth of the second external teeth, t1 is a depth along a tooth depth direction from a tooth top land of the first external teeth to the deepest part, and t2 is a depth along the tooth depth direction from a tooth top land of the second external teeth to the deepest part, the depths t1 and t2 satisfy any one of following conditions 1 to 3, the condition 1 being:

$0.9h1 < t1 < 1.3h1$, and $0.3h2 < t2 < 0.9h2$;

the condition 2 being:

$0.3h1 < t1 < 0.9h1$, and $0.9h2 < t2 < 1.3h2$; and the condition 3 being:

$0.3h1 < t1 < 0.9h1$, and $0.3h2 < t2 < 0.9h2$.

In the externally toothed gear of the dual-type strain wave gearing, the first and second external teeth differ in number, so that different tooth cutters are used to cut the first and second external teeth. In the present invention, the gap functioning as a cutter clearance area is formed in the tooth-trace-direction center portion of the externally toothed gear, namely, between the first and second external teeth. The manner in which the gap is formed has a prominent effect on the tooth contact of the first external teeth with respect to the first internal teeth along the tooth trace direction, as well as the tooth flank load distribution. The manner in which the gap is formed similarly has a prominent effect on the tooth contact of the second external teeth with respect to the second internal teeth along the tooth trace direction, as well as the tooth flank load distribution.

According to the present invention, the maximum width L1 of the gap is set within a range of 0.1 to 0.35 times the width L of the externally toothed gear to form a prescribed cutter clearance area. In addition, the relationships between the depths t1 and t2 and the tooth depths h1, h2 of the first and second external teeth are set to satisfy either one of the above-mentioned three conditions 1 to 3. Forming the gap in this manner makes it possible to maintain uniformity in the tooth-trace-direction tooth flank load distributions in the tooth trace direction of the first and second external teeth and to maintain a suitable state for the tooth contact of the first and second external teeth with respect to the first and second internal teeth at each position in the tooth trace direction.

In particular, according to the present invention, it is possible to relatively increase rigidity of the portions on the side of the inner end surfaces of the first and second external teeth in the tooth trace direction. This makes it possible to reduce torsion occurred in the first and second external teeth when load is applied, and to mitigate partial contact of the first and second external teeth with respect to the respective internal teeth. As a result, stress is distributed suitably in the tooth trace direction in the meshing portions of teeth, whereby wear resistance and fatigue strength of the externally toothed gear can be greatly enhanced.

Next, in a case in which the wave generator of the dual-type strain wave gearing of the present invention has a first wave bearing provided with a ball bearing for supporting the first external teeth, and a second wave bearing provided with a ball bearing for supporting the second external teeth, it is desirable that the bearing-ball centers of the first wave bearing and the second wave bearing be located at positions that are equidistant, along the tooth trace direction, from a tooth-trace-direction center of the gap; and that, where an inter-ball-center distance Lo is a distance between the bearing-ball centers of the first and second wave bearings, the inter-ball-center distance Lo be set so as to increase correspondingly with an increase in the maximum width L1 of the gap, and satisfy a relationship:

$0.35L < Lo < 0.7L$.

In the present invention, the inter-ball-center distance Lo between two rows of wave bearings is increased such that it is possible to increase rigidity for supporting first and second external teeth differing in number, and to improve the tooth contact of each of the external teeth with respect to internal teeth at each position in the tooth trace direction. Specifically, a configuration is adopted in which the inter-ball-center distance Lo lengthens (increases) correspondingly with an increase in the maximum length L1 of the gap, which is formed between the first and second external teeth and functions as a cutter clearance area. The range of increase of the inter-ball-center distance Lo is set to 0.35 to 0.7 times the width L of the externally toothed gear.

According to the present invention, it is possible to arrange the first and second wave bearings such that the ball centers are positioned at suitable positions in the tooth trace direction with respect to each of the first and second external teeth in accordance with the width of the gap that is formed. This makes it possible to reliably support the first and second external teeth, using the first and second wave bearings, at each position in the tooth trace direction of each of the first and second external teeth (i.e., to increase the supporting rigidity of the wave generator).

As a result, it is possible to improve the tooth contact of the first and second external teeth at each tooth-trace-direction position, and to increase the tooth bottom fatigue strength thereof. It is also possible to average the bearing-ball load distribution of each of the wave bearings of the wave generator, and to reduce the maximum load; therefore, the service life of the wave generator can be improved.

In the dual-type strain wave gearing of the present invention, generally, the number Zf1 of the first external teeth differs from a number Zc1 of the first internal teeth, and the number Zf2 of second external teeth differs from a number Zc2 of second internal teeth. For example, the number Zf1 of first external teeth is less than the number Zc1 of first internal teeth, and the number Zc1 of first internal teeth and the number Zc2 of second internal teeth are equal to each other.

In addition, the wave generator is set to be a rotation-inputting element; and either one of the first internally toothed gear and second internally toothed gear is set to be a stationary-side internally toothed gear secured so as not to rotate, and the other of the first internally toothed gear and second internally toothed gear is a drive-side internally toothed gear that is a reduced-rotation-outputting element.

Furthermore, the first and second external teeth of the externally toothed gear are flexed into an ellipsoidal shape, a three-lobe shape or other non-circular shape by the wave generator. This makes the externally toothed gear to mesh with the rigid internally toothed gear on plural positions apart from one another along the circumferential direction. Typically, the externally toothed gear is flexed into an ellipsoidal shape and is meshed with the internally toothed gear on two positions apart from 180 degrees along the circumferential direction (i.e. on both end positions of the major axis of the ellipsoidal shape). In this case, the differences between the tooth number Zf1 of the first external teeth and the tooth number Zf2 of the second external teeth are set to be 2n, where n is a positive integer.

MODE FOR CARRYING OUT THE INVENTION

An embodiment of a dual-type strain wave gearing to which the present invention is applied is described below with reference to the attached drawings.

Figures 1A, 1B:
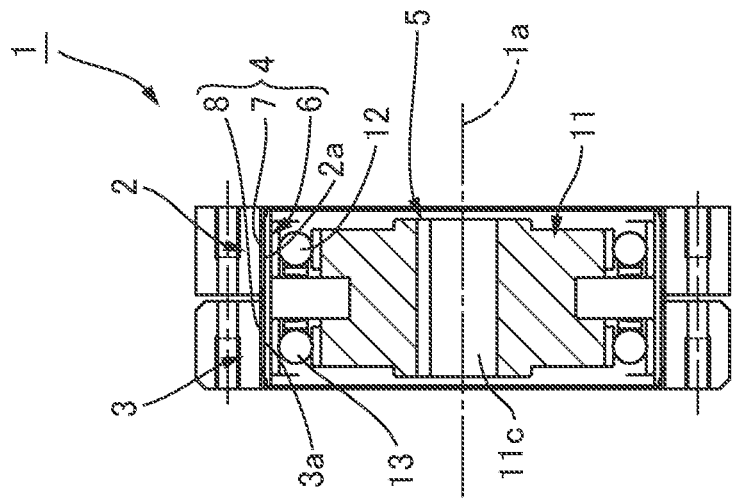
FIG. 1A is an end view of a dual-type strain wave gearing to which the present invention is applied.
FIG. 1B is a longitudinal cross-sectional view of the strain wave gearing of FIG. 1A.
Figure 2:
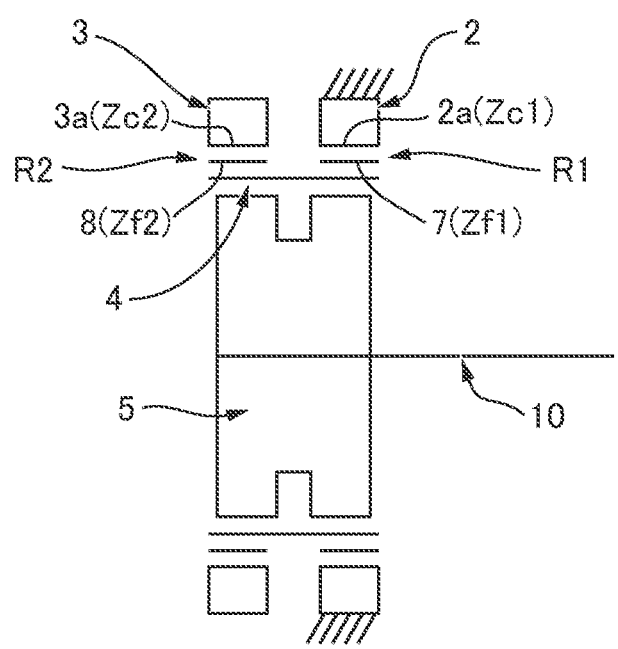
FIG. 2 is a schematic diagram of the dual-type strain wave gearing of FIG. 1A.

FIG. 1A is an end view illustrating a dual-type strain wave gearing (referred to below simply as "strain wave gearing") according to an embodiment of the present invention, and FIG. 1B is a longitudinal cross-sectional view illustrating a portion cut along line 1B-1B in FIG. 1A. FIG. 2 is a schematic diagram of the strain wave gearing of FIG. 1A. The strain wave gearing 1, which is used as, e.g., a speed reducer, has an annular rigid first internally toothed gear 2, an annular rigid second internally toothed gear 3, a cylindrical flexible externally toothed gear 4 provided with a radially flexible thin-walled elastic body, and an ellipsoidally contoured wave generator 5.

The first and second internally toothed gears 2, 3 are disposed so as to be coaxially aligned in parallel with each other, with a prescribed gap therebetween, along the direction of a center axis line 1a. In the present example, the first internally toothed gear 2 is a stationary-side internally toothed gear secured so as not to rotate, the number of first internal teeth 2a thereof being indicated by Zc1. The second internally toothed gear 3 is a rotatably supported drive-side internally toothed gear, the number of second internal teeth 3a thereof being indicated by Zc2. The second internally toothed gear 3 is the reduced-rotation-outputting element of the strain wave gearing 1.

The cylindrical externally toothed gear 4 is disposed coaxially inside the first and second internally toothed gears 2, and 3. The externally toothed gear 4 has a cylindrical body 6 that is a radially flexible thin-walled elastic body, first external teeth 7 and second external teeth 8 formed in the circular outer peripheral surface of the cylindrical body 6, and a gap 9 (refer to FIGS. 3A, 3B and 3C) formed between the external teeth 7 and 8 on either side, the gap 9 functioning as a cutter clearance area. The first external teeth 7 are formed on one side along the direction of the center axis line 1a of the circular outer peripheral surface of the cylindrical body 6, and the second external teeth 8 are formed on the other side of the circular outer peripheral surface. The first and second external teeth 7 and 8 are formed such that the direction of the center axis line 1a is the tooth trace direction.

Specifically, the first external teeth 7 are formed on the side opposing the first internal teeth 2a and are capable of meshing with the first internal teeth 2a, the number of first external teeth 7 being indicated by Zf1. The second external teeth 8 are formed on the side opposing the second internal teeth 3a and are capable of meshing with the second internal teeth 3a, the number of second external teeth 8 being indicated by Zf2. The numbers Zf1 and Zf2 of teeth are different from each other.

The wave generator 5 has an ellipsoidally contoured rigid plug 11, and a first wave bearing 12 and second wave bearing 13, the first and second wave bearings being fitted to the ellipsoidal outer peripheral surface of the rigid plug 11. The first and second wave bearings 12 and 13 are formed from ball bearings.

The wave generator 5 is inserted into the inner peripheral surface of the cylindrical body 6 of the externally toothed gear 4, and causes the cylindrical body 6 to flex in an ellipsoidal shape. Therefore, the first and second external teeth 7, 8 are also flexed in an ellipsoidal shape. The ellipsoidally flexed externally toothed gear 4 meshes with the first and second internally toothed gears 2 and 3 at both end positions along the major axis Lmax of the ellipsoidal shape. Specifically, the first external teeth 7 mesh with the first internal teeth 2a at both end positions along the major axis Lmax of the ellipsoidal shape, and the second external teeth 8 mesh with the second internal teeth 3a at both end positions along the major axis Lmax.

The wave generator 5 is the rotation-input element of the strain wave gearing 1. The rigid plug 11 of the wave generator 5 has a shaft hole 11c, in which an input rotation shaft 10 (refer to FIG. 2) is securely connected in a coaxial arrangement. For example, a motor output shaft may be securely connected in a coaxial arrangement in the shaft hole 11c. When the wave generator 5 rotates, the positions at which the first external teeth 7 of the externally toothed gear 4 and the stationary-side first internal teeth 2a mesh, and the positions at which the second external teeth 8 of the externally toothed gear 4 and the drive-side second internal teeth 3a mesh, move along the circumferential direction.

The number Zf1 of first external teeth 7 and the number Zf2 of second external teeth 8 differ from each other; in the present example, the number Zf2 of second external teeth is greater. The number Zc1 of first internal teeth 2a and the number Zf1 of first external teeth 7 also differ from each other; in the present example, the number Zc1 of first internal teeth 2a is greater. The number Zc2 of second internal teeth 3a and the number Zf2 of second external teeth 8 differ from each other; in the present example, the number Zc2 of second internal teeth 3a is less.

In the present example, the externally toothed gear 4 is caused to flex in an ellipsoidal shape, and meshes with the internally toothed gears 2 and 3 at two locations along the circumferential direction. Therefore, the difference between the number Zf1 of first external teeth 7 and the number Zf2 of second external teeth 8 is $2n_0$, where $n_0$ is a positive integer. Likewise, the difference between the number Zc1 of first internal teeth 2a and the number Zf1 of first external teeth 7 is $2n_1$, where $n_1$ is a positive integer. The difference between the number Zc2 of second internal teeth 3a and the number Zf2 of second external teeth 8 is $2n_2$, where $n_2$ is a positive integer.

$$Zf2=Zf1+2n_0$$

$$Zc1 = Zf1 + 2n_1$$

$$Zc2 = Zf2 - 2n_2$$

In a specific example, the numbers of teeth are set as follows ($n_0=2$, $n_1=n_2=1$):

Zc1=62
Zf1=60
Zc2=62
Zf2=64

The speed ratio R1 between the first internally toothed gear 2 and the first external teeth 7, and the speed ratio R2 between the second internally toothed gear 3 and the second external teeth 8, are respectively defined as follows:

$$1/R1 = (Zf1-Zc1)/Zf1 = (60-62)/60 = -1/30$$

$$1/R2 = (Zf2-Zc2)/Zf2 = (64-62)/64 = 1/32$$

Therefore, R1=−30, and R2=32.

The speed ratio R of the strain wave gearing 1 is represented by the following formula using the speed ratios R1, and R2. Thus, according to the present invention, a strain wave gearing having a dramatically low speed ratio can be realized (a negative speed ratio indicates that output rotation progresses in the direction opposite that of input rotation).

$$R = (R1 \times R2 - R1)/(-R1 + R2)$$
$$= (-30 \times 32 + 30)/(30 + 32)$$
$$= -930/62$$
$$= -15$$

(Gap: Cutter Clearance Area)

Figure 3A:
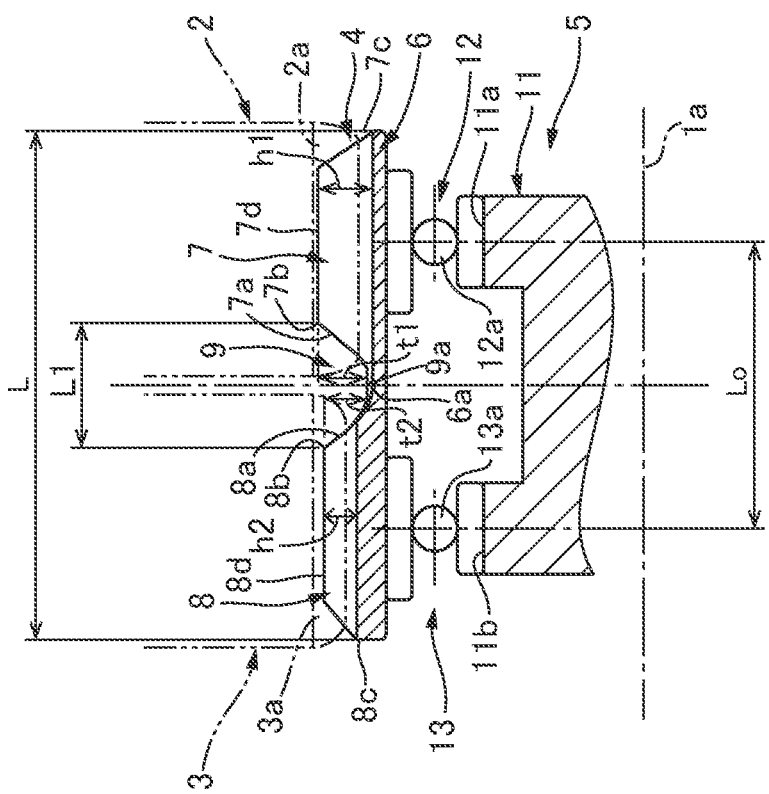
FIG. 3A is an explanatory view illustrating an example of a gap between the first and second external teeth in the strain wave gearing of FIG. 1A.
Figure 3B:
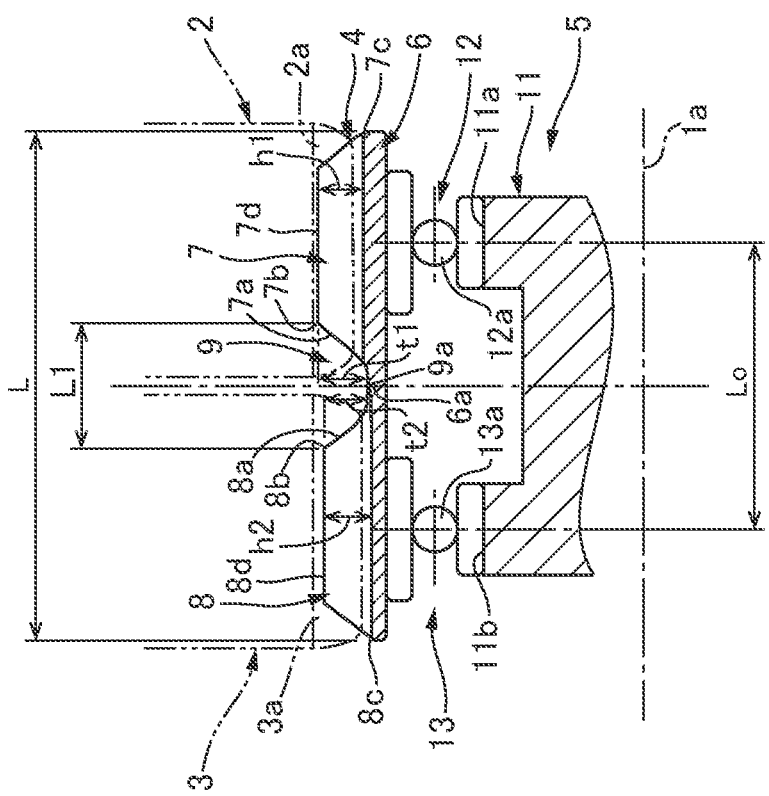
FIG. 3B is an explanatory view illustrating another example of the gap between the first and second external teeth in the strain wave gearing of FIG. 1A.
Figure 3C:
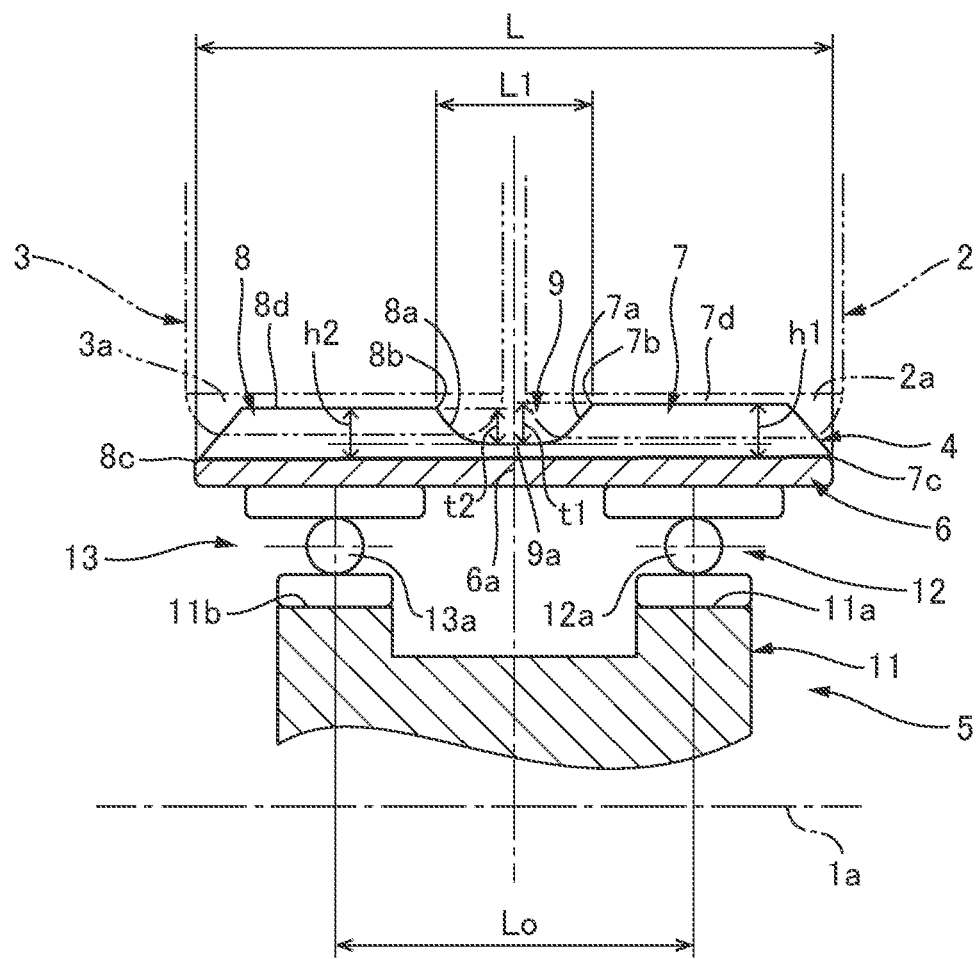
FIG. 3C is an explanatory view illustrating yet another example of the gap between the first and second external teeth in the strain wave gearing of FIG. 1A.

FIGS. 3A, 3B and 3C are explanatory views illustrating examples of the gap 9. Parts in FIGS. 3B and 3C corresponding to those in FIG. 3A are denoted by the same reference numerals as in FIG. 3A. The gap 9 formed between the first and second external teeth 7 and 8 functions as a cutter clearance area for tooth-cutting cutters used for cutting the first and second external teeth 7 and 8.

The first and second external teeth 7 and 8 will be explained with reference to FIG. 3A. Since the first and second internal teeth 2a and 3a has substantially the same tooth width, the first external teeth 7 and the second external teeth 8 having the same tooth width are formed in a symmetrical state with respect to the center position 6a in the tooth trace direction of the cylindrical body 6. When the first and second internal teeth differ in tooth width with each other, the first and second external teeth 7 and 8 will correspondingly differ in tooth width.

The gap 9 has a prescribed width along the tooth trace direction; the deepest part, which is the part of the gap 9 that is formed deepest along the tooth depth direction, is formed in the tooth-trace-direction center portion. In the present example, the deepest part 9a is a portion at which the tooth-trace-direction center portion is defined by a straight line extending parallel to the tooth trace direction, as viewed from the tooth-thickness direction. At the two tooth-trace-direction ends of the deepest part 9a, a concave arcuate curve that defines the tooth-trace-direction inner-end surface 7a of the first external teeth 7 and a concave arcuate curve that defines the tooth-trace-direction inner-end surface 8a of the second external teeth 8 are smoothly connected. It is also possible to adopt a configuration in which the deepest part 9a is defined by a concave curved surface and the two inner-end surfaces 7a, 8a are defined by inclined straight lines. It is furthermore possible to adopt a configuration in which the deepest part 9a is defined by a straight line and the two inner-end surfaces 7a, and 8a are defined by inclined straight lines.

The tooth-trace-direction width of the gap 9 in the present example gradually increases from the deepest part 9a along the tooth depth direction. The maximum width L1 in the tooth trace direction is the distance, along the tooth trace direction, from the tooth-trace-direction inner end 7b of the addendum circle of the first external teeth 7 to the tooth-trace-direction inner end 8b of the addendum circle of the second external teeth 8.

The Relationship $$0.1L < L1 < 0.35L$$

is established, where L is the width from the tooth-trace-direction outer end 7c of the first external teeth 7 to the tooth-trace-direction outer end 8c of the second external teeth 8, and L1 is the maximum width of the gap 9 in the tooth trace direction.

The depth of the deepest part 9a of the gap 9 is set as follows. A tooth depth of the first external teeth is indicated by h1, a tooth depth of the second external teeth is indicated by h2, a depth from a tooth top land of the first external teeth to the deepest part in the tooth depth direction is indicated by t1, and a depth from a tooth top land of the second external teeth to the deepest part in the tooth depth direction is indicated by t2. The depths t1 and t2 are set so as to satisfy any one of the following three Conditions 1 to 3. FIG. 3A is an explanatory view in a case in which Condition 1 is satisfied, FIG. 3B is an explanatory view in a case in which Condition 2 is satisfied, and FIG. 3C is an explanatory view in a case in which Condition 3 is satisfied.

$$0.9h1 < t1 < 1.3h1$$

$$0.3h2 < t2 < 0.9h2 \quad \text{(Condition 1)}$$

$$0.3h1 < t1 < 0.9h1$$

$$0.9h2 < t2 < 1.3h2 \quad \text{(Condition 2)}$$

$$0.3h1 < t1 < 0.9h1$$

$$0.3h2 < t2 < 0.9h2 \quad \text{(Condition 3)}$$

In the externally toothed gear 4 of the dual-type strain wave gearing 1, different tooth cutters are used to cut the first and second external teeth 7 and 8. For this reason, the gap 9 functioning as a cutter clearance area is formed in the center portion of the externally toothed gear in the tooth trace direction, namely, between the first and second external teeth 7 and 8.

The manner in which the gap 9 is formed makes it possible to uniform tooth-flank load distribution of the first and second external teeth 7 and 8 in the tooth trace direction and to maintain the tooth contact of the first and second external teeth 7 and 8 with the first and second internal teeth 2a and 3a at each position along the tooth trace direction to be a suitable state. In particular, it is possible to relatively increase rigidity of the portions on the side of each tooth-trace-direction inner-end surface of the first and second external teeth 7 and 8. This makes it possible to reduce torsion occurred in the first and second external teeth 7 and 8 when load is applied, and to mitigate partial contact of the first and second external teeth 7 and 8 with the respective internal teeth. As a result, stress is distributed suitably in the tooth trace direction in the tooth meshing portions, whereby wear resistance and fatigue strength of the externally toothed gear can be greatly enhanced. Therefore, it is possible to easily realize a strain wave gearing having a speed ratio not greater than 30, and at the same time to realize a strain wave gearing which is high in wear resistance, fatigue strength and load capacity.

[Distance Between Bearing-Ball Centers]

The distance between the bearing-ball centers of the first and second wave bearings 12 and 13 are described next with reference to FIG. 3A.

In the rigid plug 11 of the wave generator 5, an ellipsoidally contoured first outer peripheral surface 11a of fixed width is formed on one side in the center axis line direction, and an ellipsoidally contoured second outer peripheral surface 11b of fixed width is formed on the other side in the center axis line direction. The first outer peripheral surface 11a and the second outer peripheral surface 11b are ellipsoidal outer peripheral surfaces having the same shape and the same phase.

The first wave bearing 12 is fitted to the first outer peripheral surface 11a in a state of being flexed in an ellipsoidal shape, and the second wave bearing 13 is fitted to the second outer peripheral surface 11b in a state of being flexed in an ellipsoidal shape. The first and second wave bearings 12 and 13 are of the same size.

The bearing centers 12a and 13a of the first wave bearing 12 and second wave bearing 13 are located at positions that are equidistant, along the tooth width direction, from the center position 6a in the tooth trace direction on the externally toothed gear 4. The distance between bearing-ball centers is set so as to increase correspondingly with an increase in the maximum width L1 of the gap 9. Furthermore, the inter-ball-center distance Lo is set so as to reach a value within the range indicated by the following formula, Lo being the distance between bearing-ball centers.

$$0.35L < Lo < 0.7L$$

In this example, the inter-ball-center distance Lo between two rows of wave bearings 12 and 13 is increased such that it is possible to increase rigidity for supporting first and second external teeth 7 and 8 differing in number, and to improve the tooth contact of each of the external teeth 7 and 8 with respect to internal teeth 2a and 3a at each position in the tooth trace direction. Specifically, a configuration is adopted in which the inter-ball-center distance Lo lengthens (increases) correspondingly with an increase in the tooth-trace-direction maximum length L1 of the gap 9, which is formed between the first and second external teeth 7 and 8 and functions as a cutter clearance area. The range of increase of the inter-ball-center distance Lo is set to 0.35 to 0.7 times the width L of the externally toothed gear 4.

It is possible to arrange the first and second wave bearings 12 and 13 such that the ball centers are arranged at positions in the tooth trace direction with respect to each of the first and second external teeth 7 and 8 in accordance with the width of the gap 9 that is formed. This makes it possible to reliably support the first and second external teeth 7 and 8, using the first and second wave bearings 12 and 13, at each position of each of the first and second external teeth 7 and 8 in the tooth trace direction (i.e., to increase the supporting rigidity of the wave generator 5).

As a result, it is possible to improve the tooth contact of the first and second external teeth 7 and 8 at each position in the tooth trace direction, and to increase the tooth bottom fatigue strength thereof. It is also possible to average the bearing-ball load distribution of each of the wave bearings 12 and 13 of the wave generator 5, and to reduce the maximum load; therefore, the service life of the wave generator 5 can be improved.

[Other Embodiments]

In the example described above, the first internally toothed gear 2 is configured as a stationary-side internally toothed gear, and the second internally toothed gear 3 is configured as a drive-side internally toothed gear. It is possible to instead configure the first internally toothed gear 2 as a drive-side internally toothed gear, and configure the second internally toothed gear 3 as a stationary-side internally toothed gear.

It is also possible to flex the externally toothed gear 4 by the wave generator 5 into a non-circular shape other than an ellipsoidal shape, for example, into a non-circular shape such as a three-lobe shape. When h represents the number of meshing positions between the externally toothed gear flexed into a non-circular shape and the internally toothed gear, the difference in the number of teeth between the two gears may be set hp, where h is a positive integer equal to or more than 2, and p is a positive integer.

The invention claimed is:

1. A dual-type strain wave gearing comprising:
   a rigid first internally toothed gear in which first internal teeth are formed;
   a rigid second internally toothed gear in which second internal teeth are formed, the second internally toothed gear being disposed so as to be coaxially aligned in parallel with the first internally toothed gear;
   a flexible externally toothed gear in which first external teeth capable of meshing with the first internal teeth and second external teeth capable of meshing with the second internal teeth are formed in an outer peripheral surface of a radially flexible cylindrical body, the second teeth differing in number from the first teeth, and the externally toothed gear being disposed coaxially inside the first and second internally toothed gears; and
   a wave generator for flexing the externally toothed gear to flex in a radial direction thereof to cause the first external teeth to partially mesh with the first internal teeth and to cause the second external teeth to partially mesh with the second internal teeth;
   wherein a gap is formed between a tooth-trace-direction inner-end surface of the first external teeth and a tooth-trace-direction inner-end surface of the second external teeth, the gap having a prescribed width along a tooth trace direction, and the gap having a deepest part in a tooth depth direction that is located at a center portion in the tooth trace direction;
   a relationship $$0.1L < L1 < 0.35L$$

is satisfied, where L is a width along the tooth trace direction from a tooth-trace-direction outer end of the first external teeth to a tooth-trace-direction outer end of the second external teeth, and L1 is a maximum width of the gap along the tooth trace direction; and
   wherein, where h1 is a tooth depth of the first external teeth, h2 is a tooth depth of the second external teeth, t1 is a depth along a tooth depth direction from a tooth top land of the first external teeth to the deepest part, and t2 is a depth along the tooth depth direction from a tooth top land of the second external teeth to the deepest part,
   the depths t1 and t2 satisfy any one of following conditions 1 to 3,
   the condition 1 being:

$0.9h1<t1<1.3h1$, and $0.3h2<t2<0.9h2$;

the condition 2 being:

$0.3h1<t1<0.9h1$, and $0.9h2<t2<1.3h2$; and the condition 3 being:

$0.3h1<t1<0.9h1$, and $0.3h2<t2<0.9h2$.

2. The strain wave gearing according to claim 1,
wherein the wave generator has a first wave bearing provided with a ball bearing for supporting the first external teeth, and a second wave bearing provided with a ball bearing for supporting the second external teeth;
wherein bearing-ball centers of the first wave bearing and the second wave bearing are located at positions that are equidistant, along the tooth trace direction, from a center of the gap in the tooth trace direction; and
wherein, where an inter-ball-center distance Lo is a distance between the bearing-ball centers of the first and second wave bearings,
the inter-ball-center distance is set so as to increase correspondingly with an increase in the maximum width L1 of the gap, and satisfies a relationship $0.35L<Lo<0.7L$.

3. The strain wave gearing according to claim 1,
wherein a number of the first external teeth differs from a number of the first internal teeth, and
a number of second external teeth differs from a number of second internal teeth.

4. The strain wave gearing according to claim 1,
wherein a number of first external teeth is less than a number of first internal teeth, and
a number of first internal teeth and a number of second internal teeth are equal to each other.

5. The strain wave gearing according to claim 1,
wherein the wave generator is a rotation-inputting element; and
either one of the first internally toothed gear and second internally toothed gear is a stationary-side internally toothed gear secured so as not to rotate, and the other of the first internally toothed gear and second internally toothed gear is a drive-side internally toothed gear that is a reduced-rotation-outputting element.

6. The strain wave gearing according to claim 1,
wherein the wave generator causes the externally toothed gear to flex into an ellipsoidal shape so that the first external teeth are caused to mesh with the first internal teeth at two positions along a circumferential direction and the second external teeth are caused to mesh with the second internal teeth at two positions along the circumferential direction; and
a difference between a number of the first external teeth and a number of the second external teeth is 2n, where n is a positive integer.

7. The strain wave gearing according to claim 1,
wherein the wave generator comprises a first wave bearing having a ball bearing for supporting the first external teeth, and a second wave bearing having a ball bearing for supporting the second external teeth;
wherein bearing-ball centers of the first wave bearing and the second wave bearing are located at positions that are equidistant, along the tooth trace direction, from a tooth-trace-direction center of the gap; and
wherein, where an inter-ball-center distance Lo is a distance between the bearing-ball centers of the first and second wave bearings,
the inter-ball-center distance is set so as to increase correspondingly with an increase in the maximum width L1 of the gap, and satisfies a relationship $0.35L<Lo<0.7L$;

wherein a number of the first external teeth differs from a number of the first internal teeth, and a number of second external teeth differs from a number of second internal teeth; and
wherein wave generator is a rotation-inputting element; and either one of the first internally toothed gear and second internally toothed gear is a stationary-side internally toothed gear secured so as not to rotate, and the other of the first internally toothed gear and second internally toothed gear is a drive-side internally toothed gear that is a reduced-rotation-outputting element.

8. The strain wave gearing according to claim 7,
wherein the wave generator causes the externally toothed gear to flex into an ellipsoidal shape so that the first external teeth are caused to mesh with the first internal teeth at two positions along a circumferential direction and the second external teeth are caused to mesh with the second internal teeth at two positions along the circumferential direction; and a difference between the number of the first external teeth and the number of the second external teeth is 2n, where n is a positive integer.

9. The strain wave gearing according to claim 1,
wherein the wave generator comprises a first wave bearing having a ball bearing for supporting the first external teeth, and a second wave bearing having a ball bearing for supporting the second external teeth;
wherein bearing-ball centers of the first wave bearing and the second wave bearing are located at positions that are equidistant, along the tooth trace direction, from a tooth-trace-direction center of the gap; and
wherein, where an inter-ball-center distance Lo is a distance between the bearing-ball centers of the first and second wave bearings,
the inter-ball-center distance is set so as to increase correspondingly with an increase in the maximum width L1 of the gap, and satisfies a relationship $0.35L<Lo<0.7L$;

wherein a number of the first external teeth is less than a number of the first internal teeth, and the number of first internal teeth is equal to a number of second internal teeth;
wherein wave generator is a rotation-inputting element; and either one of the first internally toothed gear and second internally toothed gear is a stationary-side internally toothed gear secured so as not to rotate, and the other of the first internally toothed gear and second internally toothed gear is a drive-side internally toothed gear that is a reduced-rotation-outputting element, and
wherein the wave generator causes the externally toothed gear to flex into an ellipsoidal shape so that the first external teeth are caused to mesh with the first internal teeth at two positions along a circumferential direction and the second external teeth are caused to mesh with the second internal teeth at two positions along the circumferential direction; and a difference between the number of the first external teeth and a number of the second external teeth is 2n, where n is a positive integer.

* * * * *